Aug. 15, 1967
A. N. DU FEU
3,335,605
PRESSURE-SENSITIVE DEVICES
Filed Oct. 5, 1965
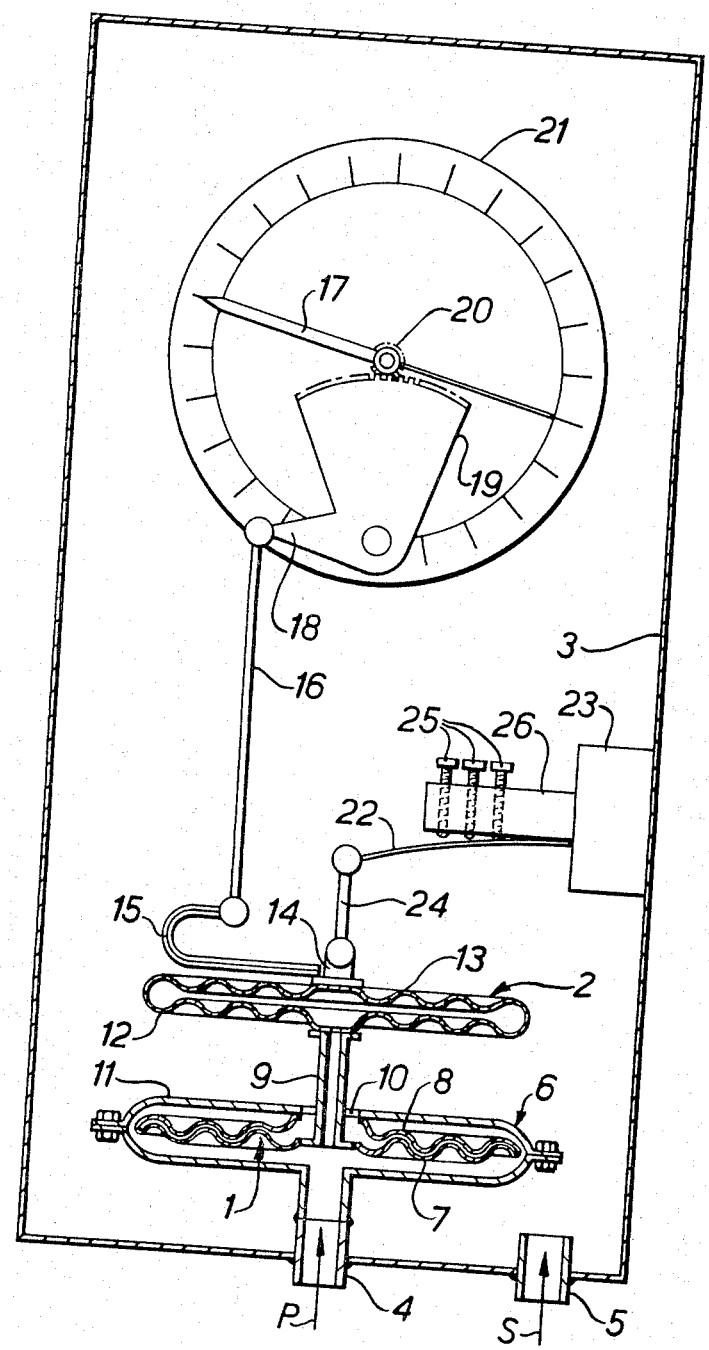
ALAN NEVILLE DU FEU - Inventor
Hall, Pollock & Vande Sande
Attorneys

United States Patent Office

3,335,605
Patented Aug. 15, 1967

---

3,335,605
PRESSURE-SENSITIVE DEVICES
Alan Neville Du Feu, Cheltenham, England, assignor to S. Smith & Sons (England) Limited, London, England, a British company
Filed Oct. 5, 1965, Ser. No. 493,064
Claims priority, application Great Britain, Oct. 9, 1964, 41,285/64
1 Claim. (Cl. 73—182)

This invention relates to pressure-sensitive devices.

The invention is particularly, though not exclusively, applicable to airspeed indicators including pressure-sensitive devices.

Airspeed indicators include pressure-sensitive devices to respond to difference between pitot and static air-pressures. With conventional pressure-sensitive devices used in airspeed indicators of aircraft, the range of pitot-static pressure differential, and therefore the extent of airspeed variation that can be covered, is somewhat limited. In general, the upper extreme of any range of airspeed indication that can be provided is dictated by the lowest value that is to be included. For example, where the upper extreme is to be about 700 knots a range extending down to about 80 knots can be provided, but where the lowest value is to be about 20 knots the upper extreme is limited to about 200 knots.

In certain applications, such as for example with VTOL (Vertical Take-Off and Land) aircraft, there is a requirement to provide an airspeed-indicator to cover a wider range of airspeeds, for example from 30 to 800 knots, than can be covered using a conventional pressure-sensitive device. Various suggestions have been made for meeting this requirement but have been found unsatisfactory for one reason or another in practice. It is an object of the present invention to provide a pressure-sensitive device that may be used satisfactorily to meet the requirement for a wide-range airspeed indicator.

According to the present invention, in a pressure-sensitive device, an elastically-deformable pressure-sensor is arranged to be responsive to applied pressure differential in such a manner that when the value of the pressure differential is varied from one extreme to the other of a predetermined range of values the sensor is caused progressively to contract to become fully collapsed at an intermediate value of said range, and means is arranged to provide a measure which is dependent upon the value of said differential pressure throughout said range in accordance with the additive combination of a first component measure that is dependent upon the extent of contraction of the sensor and a second component measure that is dependent upon the value of said differential pressure through said intermediate value to said other extreme of the range.

The elastically-deformable pressure-sensor may be a capsule, and in this case the device may include a second capsule that is arranged to be responsive to said pressure differential in such a manner that when the value of the pressure differential is varied at least through said intermediate value to said other extreme, the second capsule is caused progressively to expand. In this case, the said second component measure may be a measure dependent upon the extent of expansion of the second capsule.

According to a feature of the present invention, an airspeed indicator for providing indication of airspeed throughout a predetermined range and in accordance with difference between pitot and static air pressures, comprises a first manometric capsule that is arranged to have the pitot-static pressure differential applied thereto in a sense such that increase in said pressure differential with increase in airspeed from the lower extreme of said range causes the capsule progressively to contract to become fully collapsed at an intermediate value of the airspeed range, a second manometric capsule that is arranged to have the pitot-static pressure differential applied thereto in a sense such that increase in said pressure differential with increase in airspeed through the said intermediate value to the upper extreme of the airspeed range causes progressive expansion of the second capsule, means coupling the two capsules in mechanical series with one another to provide a mechanical displacement that is dependent upon the extents of contraction and expansion respectively of the first and second capsules such that increase in contraction of the first capsule and increase in expansion of the second capsule both produce increase in said mechanical displacement, and means for providing throughout said range an indication of airspeed dependent upon said displacement.

The second capsule is preferably of a higher rate than said first capsule, that is to say, the rate of change of applied pressure differential with consequent change in deflection (expansion or contraction) of the second capsule is preferably higher than the corresponding rate of the first capsule, with the result that the first capsule provides a larger contribution to the output indication for lower airspeeds than the second capsule.

An aircraft airspeed indicator in accordance with the present invention will now be described, by way of example, with reference to the accompanying drawing. In the drawing, the airspeed indicator is shown as coupled to the normal pitot and static pressure system of an aircraft.

Referring to the drawing, low- and high-rate capsules 1 and 2 respectively are both mounted within an air-tight case 3 of the indicator, to respond to difference between the air pressure within the case 3 and air pressure conveyed to the indicator via a pitot-pressure inlet 4 coupled to the pitot pressure-line of the aircraft. A static-pressure inlet 5, which is coupled to the static pressure-line of the aircraft, opens into the case 3 so that both capsules 1 and 2 are thereby responsive to the pitot-static pressure differential (P-S).

The capsule 1, which is mounted within a box 6 that is in direct communication with the pitot-pressure inlet 4, is formed by two corrugated and annular diaphragms 7 and 8 that are sealed together around their outer peripheries. A hollow pillar 9 serves to connect the interior of the box 6 to the interior of the capsule 2 so as to communicate the pitot pressure P within the box 6 to the capsule 2. The pillar 9 at its end within the box 6 is sealed into the central aperture of the diaphragm 7 so as to open into the box 6 externally of the capsule 1, the pillar 9 extending from this end through the central aperture of the diaphragm 8 and a corresponding aperture 10 in a wall 11 of the box 6. The diaphragm 8 is sealed around its central aperture to the portion of the wall 11 surrounding the aperture 10, so that the interior of the capsule 1 is maintained at the static pressure S obtaining externally of the box 6. As airspeed increases, and the pitot pressure P within the box 6 in consequence increases with respect to the static pressure S, the capsule 1 contracts towards a collapsed state. The capsule 2, on the other hand, having its interior coupled via the pillar 9 to the pitot pressure P within the box 6, expands.

The capsule 2 is formed by two corrugated diaphragms 12 and 13 that are sealed together around their peripheries. The diaphragm 12 is sealed to the pillar 9 where this opens into the capsule 2, thereby mounting the capsule 2 on the pillar 9 to move axially therewith relative to the case 3. A coupling member 14 is sealed to the diaphragm 13, and this is connected via a bi-metallic element 15 that provides for temperature compensation, and a link 16, to a pointer 17 of the indicator. The link 16 is coupled to an arm 18 of a sector gear 19 that drives a pinion 20 carrying the pointer 17, the pointer 17 thereby being arranged to rotate with respect to a scale 21, calibrated in terms of airspeed, in accordance with any movement of the coupling member 14 that results from deflection (expansion or contraction) of either capsule 1 or 2.

The capsules 1 and 2, arranged as described above with the diaphragm 8 of the capsule 1 rigidly fixed to the case 3 by virtue of its attachment to the box 6, and with the pillar 9 rigidly interconnecting the diaphragms 7 and 12, are in mechanical series with one another between the case 3 and the coupling member 14. Accordingly, variation in the pitot-static pressure differential (P-S) sensed by the capsules 1 and 2 produces rectilinear displacement of the member 14 and gives rise to rotational displacement of the pointer 17 dependent upon the deflections of both capsules 1 and 2. The deflection produced by the capsule 1 acts to augment the corresponding deflection produced by the capsule 2 so that the resultant displacement of the member 14, and consequently of the pointer 17, is in accordance with the additive combination of the contraction of one capsule and the expansion of the other.

The instrument covers a range of indicated airspeed of from 30 to 800 knots, and as the sensed pitot-static pressure differential (P-S) increases with increase in airspeed from 30 knots, the capsule 1 contracts progressively and the capsule 2 expands. The low-rate capsule 1 becomes fully collapsed at a predetermined intermediate value of pitot-static pressure differential, this value corresponding to an indicated airspeed of, for example, 250 knots. The capsule 1 in this condition is substantially solid with the diaphragm 7 in direct contract with the diaphragm 8. The solidity is enhanced by the fact that the diaphragms 7 and 8 (rather than having their corrugations symmetrically arranged with respect to the central plane of the capsule, as in the case of the diaphragms 12 and 13 of the more conventional capsule 2) have their corrugations so disposed that in the collapsed condition the diaphragm 7 nests directly on, and in substantially full surface contact with, the diaphragm 8. Above the intermediate value of pitot-static pressure differential, with the capsule 1 substantially solid, the capsule 2 acts effectively alone and directly, on the member 14 to produce the appropriate rotation of the pointer 17. Thus, throughout the range of pitot-static differential up to the intermediate value (which range corresponds, for example, to the indicated airspeed range of 30 to 250 knots), the capsules 1 and 2 contribute additively to the airspeed indication, whereas for a higher range (corresponding, for example, to the indicated airspeed range of 250 to 800 knots) only the high-rate capsule 2 provides any contribution. The high-rate capsule 2 provides little contribution to the airspeed indication at the lower end of the range below the intermediate value of the pitot-static pressure differential, the main contribution then being made by the low-rate capsule 1.

By suitable choice of the "deflection *versus* pressure-differential" characteristics of the capsules 1 and 2, it is possible to provide a linear relationship between rotational displacement of the pointer 17 and airspeed (so that the calibration of the scale 21 is linear) throughout the full airspeed range of the indicator. However, the arrangement described above lends itself to the provision of calibration which is linear at its lower end (for example, from 30 to 250 knots), and logarithmic or quasi-logarithmic at its upper end (for example, from 250 to 800 knots).

An M-shaped spring 22 acts on the assembly of capsules 1 and 2 to steady it against vibration. The two outer limbs of the spring 22 are clamped at their feet to a mounting 23 that is secured to the case 3, the central part of a link 24 coupled to the member 14. The spring 22 is of the spring 22 being attached to the assembly by means arranged to contact, in turn as the pitot-static pressure differential (P-S) is increased, a series of screws 25 screwed through an arm 26 of the mounting 23. The protrusion of each screw 25 through the arm 26, and thereby the deflection of the spring 22 required before the spring 22 makes contact with the screw, may be varied during calibration of the indicator so as to modify the scale-shape at the higher values of airspeed. The provision of the screws 25 in this manner is of advantage where it is desired to provide a scale-shape that is difficult to achieve with the available pressure-deflection characteristic of the capsule 2.

I claim:

A pressure-sensitive device for use throughout a range of applied pressure differential, comprising a rigid enclosure having an immovable external wall-portion with a first aperture therethrough, a first flexible diaphragm rigidly mounted on said wall-portion within said enclosure, said first diaphragm having a second aperture therethrough and being sealed around said second aperture to said wall-portion with the second aperture in communication with said first aperture, a second flexible diaphragm sealed to said first diaphragm around their respective outer peripheries to provide a first manometric capsule operative to contract progressively to a fully collapsed state in response to an increase in applied pressure differential thereto through a lower part of said range, said first and second diaphragms having complementary corrugations adapted to nest together when said first manometric capsule is fully collapsed, a second manometric capsule of higher rate than said first capsule operative to expand progressively in response to an increase in applied pressure differential thereto through an upper part of said range, said second capsule comprising third and fourth flexible diaphragms sealed together around their outer peripheries, means mounting said second capsule on said second diaphragm with said second capsule being positioned externally of said rigid enclosure, said mounting means comprising a member extending through said first and second apertures to interconnect rigidly said second and third diaphragms, said member having a bore connecting the interior of said second capsule with the interior of said rigid enclosure, means for applying a first pressure both to the exterior of said second capsule and via said first and second apertures to the interior of said first capsule, means for applying a second pressure to the interior of said rigid enclosure, means responsive to mechanical displacement of said fourth diaphragm relative to said rigid enclosure to provide an output dependent upon the difference between said first and second pressures, and spring means acting on said fourth diaphragm to oppose resiliently said mechanical displacement.

References Cited

UNITED STATES PATENTS

| | | | |
|---|---|---|---|
| 2,150,771 | 3/1939 | Kollsman | 73—393 |
| 2,185,971 | 1/1940 | Achtel et al. | 73—410 |
| 2,387,909 | 10/1945 | Ingham | 73—393 |
| 3,040,582 | 6/1958 | Lorenz | 73—393 XR |
| 3,279,250 | 10/1966 | Hezel et al. | 73—182 |

DAVID SCHONBERG, *Primary Examiner.*

LOUIS R. PRINCE, *Examiner.*

D. O. WOODIEL, *Assistant Examiner.*